H. R. WORTHINGTON.
CONICAL GATE.
No. 15,030. Patented June 3, 1856.
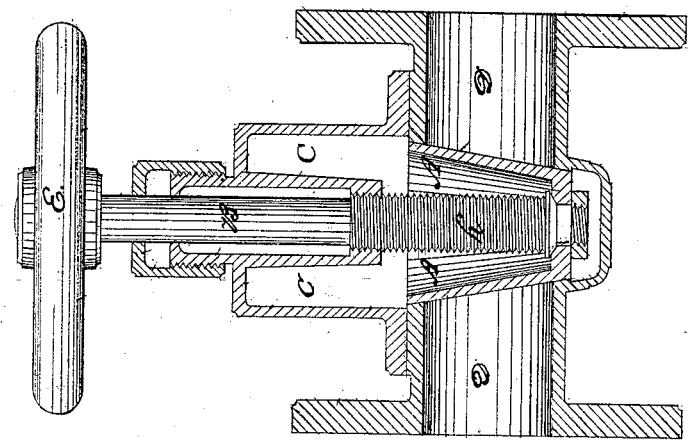
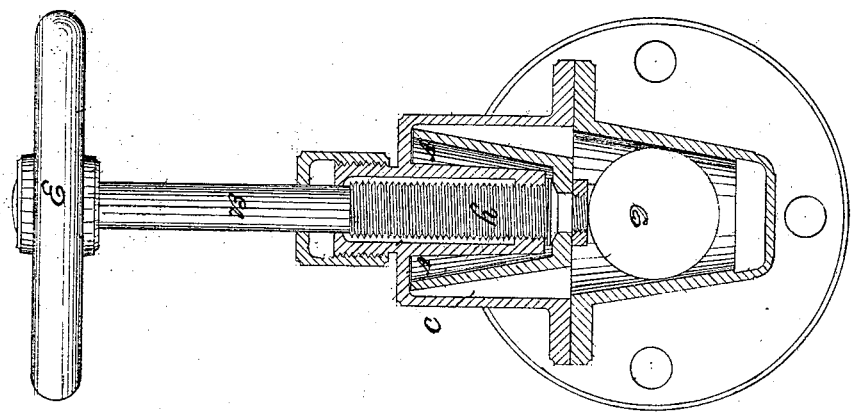
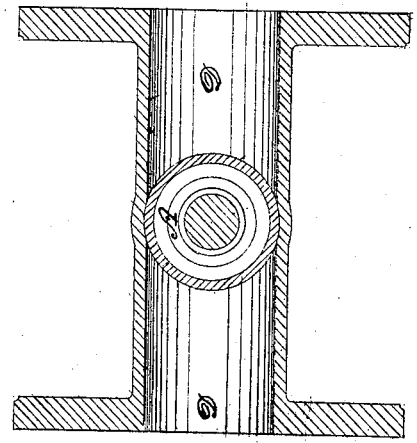
In Presence of
A. Worthington
Dauphine S. Hines
Henry R. Worthington

UNITED STATES PATENT OFFICE.

HENRY R. WORTHINGTON, OF BROOKLYN, NEW YORK.

METHOD OF ATTACHING STEMS TO CONICAL VALVES.

Specification of Letters Patent No. 15,030, dated June 3, 1856.

*To all whom it may concern:*

Be it known that I, HENRY R. WORTHINGTON, of the city of Brooklyn, county of Kings, and State of New York, have invented a new and useful Instrument for Regulating or Controlling the Flow or Discharge of Fluids, which I denominate a "Conical Gate;" and I do hereby declare that the following is a full and accurate description thereof, reference being had to the accompanying drawings, forming part of this specification, in which—

Figure 1 is a horizontal section; Fig. 2, a transverse section, and Fig. 3, a longitudinal section.

The object of my invention is to obviate the disadvantage of crooked or contracted water ways, common to the cocks and valves in ordinary use, and furnish a straight and unobstructed passage for the fluid. This effect is attained in the gate known as the Croton stop or gate—but the surfaces in that form of gate are all flat—requiring great weight of metal to resist pressures, and being very expensive and difficult in construction.

The well known conical plug cock furnishes the full sized and straight water passage, at the expense of greatly increased size and weight. Its leakages are also exterior.

My invention combines the advantages of both these forms, while it obviates the defects above stated. It may be thus described. The lettering refers to the same parts in all the figures.

D, represents the water way or pipe part of the gate.

A, is a hollow conical plug connected at the bottom to the stem B. This plug has no hole or passage through it for the water in any direction, and, when in its seat, as shown in Fig. 3 completely closes the opening through the gate.

The stem B, has a screw $h$, cut upon it, of such length as to allow travel enough to draw the plug upward from its seat, and entirely into the cap C, thereby opening the passage for the flow of the fluid, as in Fig. 2, wherein the gate is shown opened.

A projecting hub on the lower side of the cap C, forms the nut for the screw on the stem B. A stuffing box on the top of the cap, packed in the usual manner prevents leakage around the stem B. Motion being communicated to this stem by means of the wheel E, the conical plug is elevated or depressed by the action of the screw $h$.

I am aware that a solid cone or plug has been employed for a similar purpose and lifted in a similar manner, as witness a patent granted to J. L. Chapman, Oct. 11th 1841. But this important difference exists. In my invention, by the use of the hollow cone accommodation is afforded for the propelling screw and nut through which it works, while its attachment is made to the bottom of the cone in such way as to draw rather than to push the cone forward in the process of closing, thus saving or averting an injurious cramping tendency. Also by these means the machine is kept within reasonable size and of reasonable weight of material. Whereas if the solid cone were used the cap of the machine and other parts would require to be carried up high enough to give accommodation for all that part of the screw which in my arrangement is covered by the hollow cone.

Having thus described my invention and the way in which the same may be carried into useful operation, I desire to disclaim the invention of a cone or plug lifted by means of a screw in the direction of its axis. But

What I do claim as new and desire to secure by Letters Patent, is—

The use of the hollow conical plug with the apparatus for opening and closing the same attached at the bottom or near the bottom of said plug in the manner and for the purposes herein set forth.

HENRY R. WORTHINGTON.

In presence of—
ADDISON M. BURT,
A. WORTHINGTON.